C. S. STEARNS.
Wheel Hub.
No. 88,748. Patented April 6, 1869.
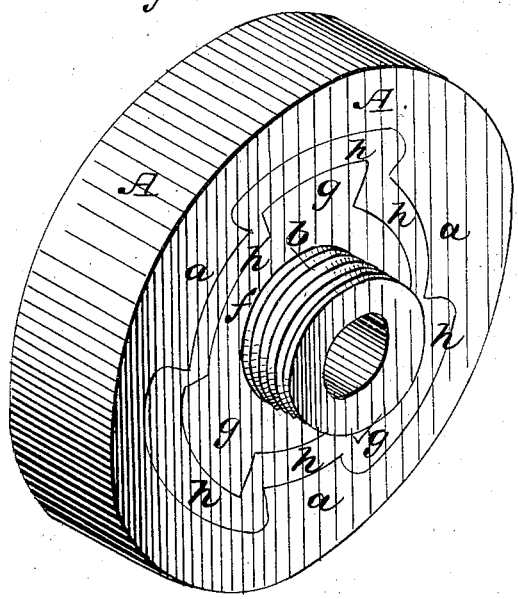
Fig. 1
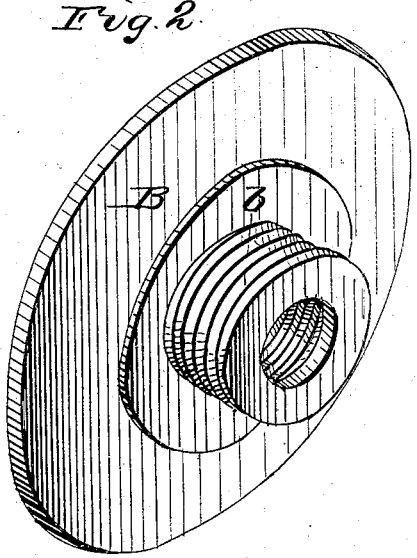
Fig. 2
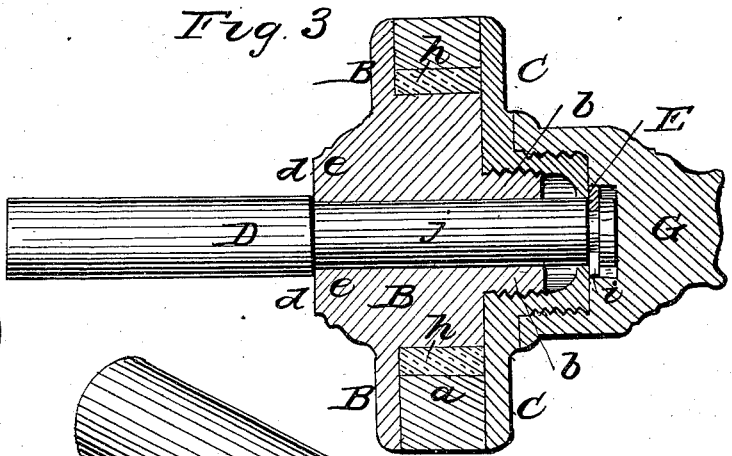
Fig. 3
Fig. 4
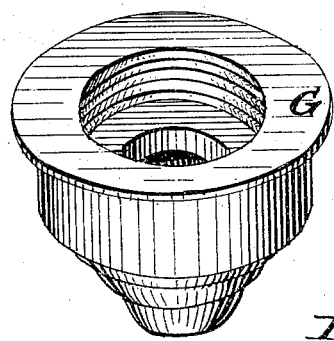
Fig. 6
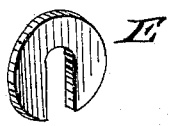
Fig. 5
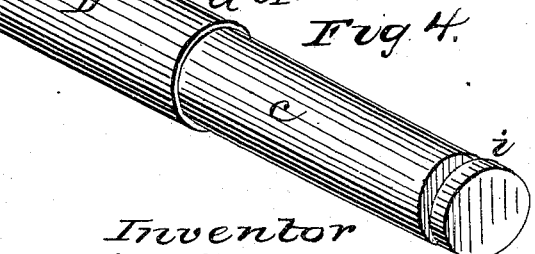
Witnesses
W. J. Cambridge
L. E. Batchler
Inventor
C. S. Stearns
Per his Attorneys
Teschemacher & Stearns

UNITED STATES PATENT OFFICE.

CALEB S. STEARNS, OF MARLBOROUGH, MASSACHUSETTS.

Letters Patent No. 88,748, dated April 6, 1869.

IMPROVEMENT IN CARRIAGE-WHEELS.

The Schedule referred to in these Letters Patent and making part of the same.

*To all whom it may concern:*

Be it known that I, CALEB S. STEARNS, of Marlborough, in the county of Middlesex, and State of Massachusetts, have invented certain Improvements in Wheels and Axles of Carriages, &c., of which the following is a full, clear, and exact description, reference being had to the accompanying drawings, making part of this specification, in which—

Figure 1 is a perspective view of the interior of a hub of a wheel of my improved construction.

Figure 2 is a perspective view of the plate which covers the exterior of the hub.

Figure 3 is a longitudinal section through the axle and hub, showing the manner in which they are secured together.

Figures 4 and 5, perspective views of the axle and the key by which it is locked in place.

Figure 6 is a perspective view of a nut which is screwed on the exterior plate of the hub, over the end of the axle.

My invention consists in a yielding bearing, provided with one or more projections, or abutments, in combination with a hub, the interior of which is likewise provided with one or more projections, or abutments, the bearing being placed within the hub, and one or more strips of rubber or other elastic material being interposed between them, to allow the bearing to yield when the wheel comes in contact with any obstacle, or in passing over an uneven road, whereby the jolting and noise produced by carriage-wheels of the ordinary construction, and the wear of the various parts of the carriage, are materially diminished.

My invention furthermore consists in an axle, the journal of which is provided with a groove for the reception of a key, for locking the hub of the wheel to the axle, a screw-nut being employed for enclosing the end of the axle and key, and being of such diameter in its interior as to prevent the key from becoming detached therefrom.

To enable others skilled in the art to understand and use my invention, I will proceed to describe the manner in which I have carried it out.

In the said drawings—

A is a hollow ring, or hub, into the interior of which projects a series of abutments, $a\ a\ a$.

B is a circular plate, of the same diameter as the periphery of the ring A, the inner face of the latter being covered thereby, while the outer face of the ring A is covered by a circular plate, C, of the same diameter, and turned over a screw-thread cut on the exterior of a projecting portion, $b$, of the plate B, the centre of both of the covering-plates B C being bored out, for the reception of the journal $c$ of the axle D, which is provided with a shoulder, at $d$, against which abuts the surface of a boss, $e$, formed on the outside of the inner covering-plate B.

From the inner side of the plate B projects a bearing, $f$, which is enclosed by the hollow ring A, and is provided with a series of abutments, $g\ g\ g$, corresponding in number to those, $a\ a\ a$, projecting from the interior of the hollow ring, the position of each of the abutments $g$ being in the centre of the space between two contiguous abutments $a$.

$h\ h$ are a series of rubber strips fitted snugly into the space between the abutments $g\ g\ g$ and inner edge of the hollow ring A, and between its abutments $a\ a\ a$ and the outer edge of the portion $f$ of the covering-plate B, the object of the rubber being to allow of the yielding of the plate B in which the axle has its bearing, whereby the concussion and noise incident to wheels of the old construction are avoided, and the wear of the various parts materially reduced, owing to the elasticity of the rubber strips.

Near the outer end of the journal of the axle is formed a circular groove, $i$, for the reception of a key, E, (see fig. 5,) for the purpose of locking the wheel securely in place upon the axle, as seen in fig. 3, and prevent the wheel becoming disconnected therefrom, the key being kept in its locking position by means of a screw-nut, G, turned over a screw-thread cut on the outside of a projection on the exterior of the outer covering-plate C.

It is evident that my improvements may be applied to carriage-wheels for ordinary roads, where the wheel turns on a non-revolving axle.

Instead of making the bearing $f$, with its abutments $g$ and projecting portion $b$, in one and the same piece as the covering-plate B, the said plate may be made separate therefrom, and both of the covering-plates be screwed to projecting portions $b$, proceeding from each side of the bearing $f$, provided with abutments $g$, without departing from the spirit of my invention.

Claim.

What I claim as my invention, and desire to secure by Letters Patent, is—

The ring A, with its abutments $a$, bearing $f$, with its abutments $g$, elastic material $h$, and covering-plates B C, in combination with the axle D, provided with the groove $i$, key E, and screw-nut G, substantially as and for the purpose described.

C. S. STEARNS.

Witnesses:
P. E. TESCHEMACHER,
W. J. CAMBRIDGE.